United States Patent
Kallhammer et al.

(10) Patent No.: US 8,228,379 B2
(45) Date of Patent: *Jul. 24, 2012

(54) NIGHT VISION DEVICE FOR A VEHICLE

(75) Inventors: Jan-Erik Kallhammer, Linkoping (SE); Dick Eriksson, Alingsas (SE); Lars Karlsson, Taby (SE); Staffan Straat, Enebyberg (SE)

(73) Assignees: Autoliv Development AB (SE); Flir Systems, Inc., Portland, OR (US)

( * ) Notice: Subject to any disclaimer, the term of this patent is extended or adjusted under 35 U.S.C. 154(b) by 1045 days.

This patent is subject to a terminal disclaimer.

(21) Appl. No.: 12/026,231

(22) Filed: Feb. 5, 2008

(65) Prior Publication Data

US 2008/0198224 A1 Aug. 21, 2008

Related U.S. Application Data

(63) Continuation of application No. 11/837,370, filed on Aug. 10, 2007, now Pat. No. 7,995,095, which is a continuation of application No. 10/753,191, filed on Dec. 31, 2003, now abandoned, which is a continuation of application No. PCT/SE01/02283, filed on Oct. 18, 2001.

(51) Int. Cl.
 *H04N 7/18* (2006.01)
(52) U.S. Cl. ...................................... 348/148; 348/164
(58) Field of Classification Search .................. 348/162, 348/164
See application file for complete search history.

(56) References Cited

U.S. PATENT DOCUMENTS

| | | | |
|---|---|---|---|
| 3,641,613 A | | 2/1972 | Povilaitis et al. |
| 4,101,202 A | * | 7/1978 | Tesch ............................ 359/706 |
| 4,533,226 A | | 8/1985 | Odone |
| 5,414,439 A | | 5/1995 | Groves et al. |
| 5,473,364 A | | 12/1995 | Burt |
| 5,619,036 A | | 4/1997 | Salvio et al. |
| 5,621,460 A | | 4/1997 | Hatlestad et al. |
| 5,646,612 A | | 7/1997 | Byon |
| 5,660,454 A | | 8/1997 | Mori et al. |

(Continued)

FOREIGN PATENT DOCUMENTS

DE   1 630 943   3/1971

(Continued)

OTHER PUBLICATIONS

Translation for FR2785434 submitted in parent U.S. Appl. No. 11/837,370 on Sep. 8, 2008.*

(Continued)

*Primary Examiner* — Mehrdad Dastouri
*Assistant Examiner* — Jeremaiah Hallenbeck-Huber
(74) *Attorney, Agent, or Firm* — Austin Rapp & Hardman

(57) ABSTRACT

In a night vision arrangement for a motor vehicle in which a camera captures an infra-red image of the roadway in front of the vehicle, a video signal generated by the camera is processed by a signal processor so that the field of view of the image displayed by a display unit is selected in accordance with a control signal. The control signal is generated by a signal generator which is responsive to one or more parameters of the movement of the vehicle. The width of the field of view may be decreased with increasing speed. The axial direction of the field of view may be adjusted depending upon the nature of a turning movement of the vehicle.

9 Claims, 3 Drawing Sheets

U.S. PATENT DOCUMENTS

| | | | |
|---|---|---|---|
| 5,760,884 A * | 6/1998 | Yahashi et al. | 356/3.14 |
| 5,828,585 A * | 10/1998 | Welk et al. | 702/96 |
| 6,000,814 A | 12/1999 | Nestell et al. | |
| 6,104,552 A | 8/2000 | Thau et al. | |
| 6,347,010 B1 | 2/2002 | Chen et al. | |
| 6,384,741 B1 | 5/2002 | O'Leary, Sr. | |
| 6,388,566 B1 | 5/2002 | Perlo et al. | |
| 6,467,940 B2 | 10/2002 | Eschler et al. | |
| 6,538,622 B1 | 3/2003 | Kojima et al. | |
| 6,550,949 B1 | 4/2003 | Bauer et al. | |
| 6,593,960 B1 | 7/2003 | Sugimoto et al. | |
| 6,840,342 B1 | 1/2005 | Hahn | |
| 6,897,892 B2 * | 5/2005 | Kormos | 348/148 |
| 6,977,630 B1 | 12/2005 | Donath et al. | |
| 7,092,007 B2 | 8/2006 | Eguchi et al. | |
| 2002/0001198 A1 | 1/2002 | Eschler et al. | |
| 2002/0067413 A1 | 6/2002 | McNamara | |
| 2003/0095688 A1 | 5/2003 | Kirmuss | |
| 2003/0202097 A1 | 10/2003 | Kallhammer et al. | |
| 2003/0227424 A1 * | 12/2003 | Lynch et al. | 345/7 |
| 2004/0061931 A1 | 4/2004 | Kallhammer et al. | |
| 2004/0085447 A1 | 5/2004 | Katta et al. | |
| 2004/0150515 A1 | 8/2004 | Kallhammer et al. | |
| 2004/0227083 A1 | 11/2004 | Kallhammer et al. | |
| 2006/0209182 A1 | 9/2006 | Eriksson | |
| 2007/0200064 A1 | 8/2007 | Remillard et al. | |
| 2008/0043105 A1 | 2/2008 | Kallhammer et al. | |
| 2008/0049106 A1 | 2/2008 | Kallhammer et al. | |
| 2008/0198224 A1 | 8/2008 | Kallhammer et al. | |

FOREIGN PATENT DOCUMENTS

| | | |
|---|---|---|
| DE | 3900667 A1 | 7/1990 |
| DE | 3942249 A1 | 7/1990 |
| DE | 19940723 A1 | 3/2001 |
| EP | 0455524 | 11/1991 |
| EP | 0455524 A1 | 11/1991 |
| EP | 0677955 A2 | 10/1995 |
| EP | 0686865 A1 | 12/1995 |
| EP | 758834 | 2/1997 |
| EP | 0758834 A2 | 2/1997 |
| EP | 1024057 A2 | 8/2000 |
| FR | 2785434 | 5/2000 |
| GB | 1142910 | 2/1969 |
| JP | 61135842 | 6/1986 |
| JP | 4093786 | 3/1992 |
| JP | 4274941 | 9/1992 |
| JP | 6048247 | 2/1994 |
| JP | 06064479 A | 3/1994 |
| JP | 6321011 | 11/1994 |
| JP | 07043209 A | 2/1995 |
| JP | 08009224 A | 1/1996 |
| JP | 8058470 | 3/1996 |
| JP | 8161698 | 6/1996 |
| JP | 9052555 | 2/1997 |
| JP | 9243392 | 9/1997 |
| JP | 9315225 | 12/1997 |
| JP | 10258682 | 9/1998 |
| JP | 10264724 A | 10/1998 |
| JP | 11263145 | 9/1999 |
| JP | 11348659 | 12/1999 |
| JP | 2000062653 A | 2/2000 |
| JP | 2000-182196 | 6/2000 |
| JP | 2000205949 | 7/2000 |
| JP | 2000264128 | 9/2000 |
| JP | 2000-285394 | 10/2000 |
| JP | 2001039218 A | 2/2001 |
| JP | 2001058543 A | 3/2001 |
| JP | 2001-150977 A | 6/2001 |
| JP | 2001233139 A | 8/2001 |
| SE | 0003942-0 | 10/2000 |
| SE | 00039438 | 10/2000 |
| SE | 519 864 | 4/2003 |
| WO | WO 0068910 | 11/2000 |
| WO | WO-01/29513 A1 | 4/2001 |
| WO | WO-0146739 A2 | 6/2001 |
| WO | WO 0163335 A2 | 8/2001 |
| WO | WO 0181972 A2 | 11/2001 |
| WO | WO 0205013 | 1/2002 |
| WO | WO-02/34572 | 2/2002 |
| WO | WO 0234572 | 5/2002 |
| WO | WO 0236389 | 5/2002 |
| WO | WO-03/091069 A1 | 6/2003 |

OTHER PUBLICATIONS

Office Action issued for U.S. Appl. No. 10/423,009 on Sep. 22, 2006.
Office Action issued for U.S. Appl. No. 10/423,054 on Jul. 19, 2007.
Office Action issued for U.S. Appl. No. 10/423,054 on Sep. 26, 2006.
Office Action issued for U.S. Appl. No. 10/512,391 on Mar. 28, 2008.
Office Action issued for U.S. Appl. No. 10/512,391 on Oct. 1, 2008.
Office Action issued for U.S. Appl. No. 10/512,391 on Jan. 16, 2009.
Office Action issued for U.S. Appl. No. 10/753,191 on Feb. 12, 2007.
Office Action issued for U.S. Appl. No. 11/837,370 on Sep. 8, 2008.
Preliminary Examination Report issued for PCT Patent Application No. PCT/SE01/02253 on Jan. 7, 2003.
Preliminary Examination Report issued for PCT Patent Application No. PCT/SE01/02283 on Jan. 21, 2003.
Preliminary Report on Patentability issued for PCT Patent Application No. PCT/SE02/00785 on Mar. 2, 2004.
Search Report issued for PCT Patent Application No. PCT/SE01/02253 on Jan. 30, 2002.
Search Report issued for PCT Patent Application No. PCT/SE01/02283 on Feb. 15, 2002.
Search Report issued for PCT Patent Application No. PCT/SE02/00785 on Nov. 25, 2002.
Advisory Action issued for U.S. Appl. No. 10/372,662 on Jun. 19, 2007.
Final Office Action issued for U.S. Appl. No. 10/423,054 on Mar. 12, 2007.
Final Office Action issued for U.S. Appl. No. 10/423,009 on Jun. 29, 2007.
Final Office Action issued for U.S. Appl. No. 11/837,370 on Jun. 9, 2009.
Notice of Abandonment issued for U.S. Appl. No. 10/372,662 on Nov. 15, 2007.
Notice of Abandonment issued for U.S. Appl. No. 10/423,054 on Mar. 24, 2009.
Notice of Abandonment issued for U.S. Appl. No. 10/753,191 on Sep. 13, 2007.
Notice of Allowance issued for U.S. Appl. No. 10/512,391 on Jun. 5, 2009.
Office Action issued for U.S. Appl. No. 10/372,662 on Feb. 23, 2007.
Office Action issued for U.S. Appl. No. 10/372,662 on Jul. 27, 2006.
Office Action issued for U.S. Appl. No. 10/423,009 on Jan. 31, 2007.

* cited by examiner

NIGHT VISION DEVICE FOR A VEHICLE

RELATED APPLICATIONS

This application is a continuation application from co-pending U.S. application Ser. No. 11/837,370, which in turn, was a continuation application from co-pending U.S. application Ser. No. 10/753,191, which in turn, was a continuation application of an International Application No. PCT/SE01/02283 entitled "A Night Vision Device for a Vehicle." All applications are incorporated herein by this reference.

BACKGROUND OF THE INVENTION

1. Field of the Invention

The present invention relates to a night vision device for a vehicle such as a motor vehicle.

2. Description of Related Art

It has been proposed previously to provide a night vision device in a vehicle such as an automobile. The purpose of the night vision device is to enhance the vision of the driver in night conditions.

Various night vision devices have been proposed before. U.S. Pat. No. 5,414,439 describes a night vision arrangement which utilises a "head-up" display. A motor vehicle is provided with an infra-red camera positioned to view the roadway in front of the vehicle. The camera generates a video signal which is passed to a "head-up" display of the type utilised in combat aircraft. In the embodiment described, the windshield of the motor vehicle or a semi-transmitter is utilised as a combiner to combine the image of the road ahead, as viewed through the windshield by the driver, and a virtual image of the road ahead from an image generator which receives the video signal from the camera.

In U.S. Pat. No. 5,414,439 the infra-red camera is mounted in a fixed position to provide an image of the view in the front of the vehicle. Also the camera has a fixed focal length. Consequently, when cornering the vehicle, that is to say when turning the vehicle to the right or to the left, the camera will always point in a direction aligned with the longitudinal axis of the vehicle. However, there is a need for the driver of the vehicle to view the environment into which the vehicle is moving which will be located either to the left or to the right of the fixed field of view of the camera.

JP-A-0 6048247 discloses a vehicle mounted infra-red image display arrangement, and in this arrangement the precise field of view that is displayed to the driver of the vehicle is dependent upon the position of the front or steering wheels of the vehicle. However, even in an arrangement such as this, it is difficult to ensure that the appropriate image is displayed, since the field of view that is of interest to the driver is not necessarily aligned with the rolling direction of the steering wheels of the vehicle.

When a motor vehicle is being driven quickly, the driver of the vehicle tends to concentrate on the road ahead of the vehicle, but, in contrast, when the vehicle is travelling slowly, for example in a built-up area, the driver usually pays attention to situations that may develop on either side of the roadway. Thus the driver may be particularly conscious of pedestrians who are not in the roadway, but who may step into the roadway in front of the vehicle. Thus, when a driver is driving quickly, the driver tends to concentrate on a relatively narrow angular field of view, whereas when the vehicle is driving more slowly, the driver tends to concentrate on a wider angular field of view. If the image provided by a night vision arrangement of the type discussed above were to be utilised to provide the wide field of view, whilst providing a sufficiently large image of the road ahead for fast driving, with a fixed focal length of the lens of the infra-red camera, a very wide display would have to be provided, which may prove to be impractical in many vehicle installations.

SUMMARY OF THE INVENTION

The present invention seeks to provide an improved night vision arrangement.

According to one aspect of this invention there is provided a night vision arrangement for a vehicle, the night vision arrangement including an infra-red-sensitive camera fixed to the motor vehicle to capture an image of the roadway in front of the vehicle, the image having a predetermined horizontal angular field of view, the camera generating a video signal representing the image, the arrangement further including a display unit adapted to display at least part of the captured image to the driver of the vehicle, characterised in that the arrangement further comprises a signal processing unit adapted to process the video signal, and a sensor unit adapted to sense one or more parameters of the movement of the vehicle, and to provide a control signal, the arrangement being such that, in use, the signal processor electronically processes the video signal so that the field of view of the image displayed by the display unit is selected in accordance with the said control signal.

Preferably the signal processor is adapted to process the video signal so that the angular extent of the field of view of the image displayed by the display unit is related to the speed of the vehicle, the sensor being adapted to sense speed.

According to another aspect of this invention there is provided a night vision arrangement for a vehicle, the night vision arrangement including an infra-red-sensitive camera fixed to the motor vehicle to capture an image of the roadway in front of the vehicle, the image having a predetermined horizontal angular field of view, the camera generating a video signal representing the image, the arrangement further including a display unit adapted to display at least part of the captured image to the drive of the vehicle, characterised in that the arrangement further comprises a sensor unit adapted to sense the speed of the vehicle and to generate a control signal, the control signal controlling an arrangement which is operative so that the angular extent of the field of view of the image displayed by the display unit is related to the speed of the vehicle.

In one embodiment the arrangement comprises a signal processing unit adapted to process the video signal, the signal processor being connected to process electronically the video signal so that the angular extent of the field of view of the image displayed by the display unit is related to the speed of the vehicle.

In another embodiment the arrangement further comprises an adjustable optical system provided on the camera, the control signal being adapted to control the adjustable optical system on the camera so that the angular extent of the field of view of the image displayed by the display unit is related to the speed of the vehicle.

Preferably part of the image captured by the camera is selected for display, that part being selected in dependence upon the direction of movement of the vehicle, the sensor being adapted to sense the direction of movement of the vehicle.

Conveniently the sensor includes means to sense the rolling direction of the steering wheel relative to the vehicle.

Advantageously the sensor senses the instantaneous position of the vehicle in a co-ordinate system to derive a signal corresponding to the driving direction and/or speed of the vehicle.

Preferably the means for sensing the instantaneous position of the vehicle incorporate a GPS sensor arrangement.

Conveniently the display unit is a monitor which displays an image directly to the vehicle operator.

Alternatively the display unit is a head-up display unit.

Preferably the head-up display unit incorporates a mirror for reflecting a virtual image to the driver of the vehicle.

Conveniently the mirror is a semi-transparent mirror, enabling the operator to view the reflected image and, simultaneously, to see a real image through the mirror.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
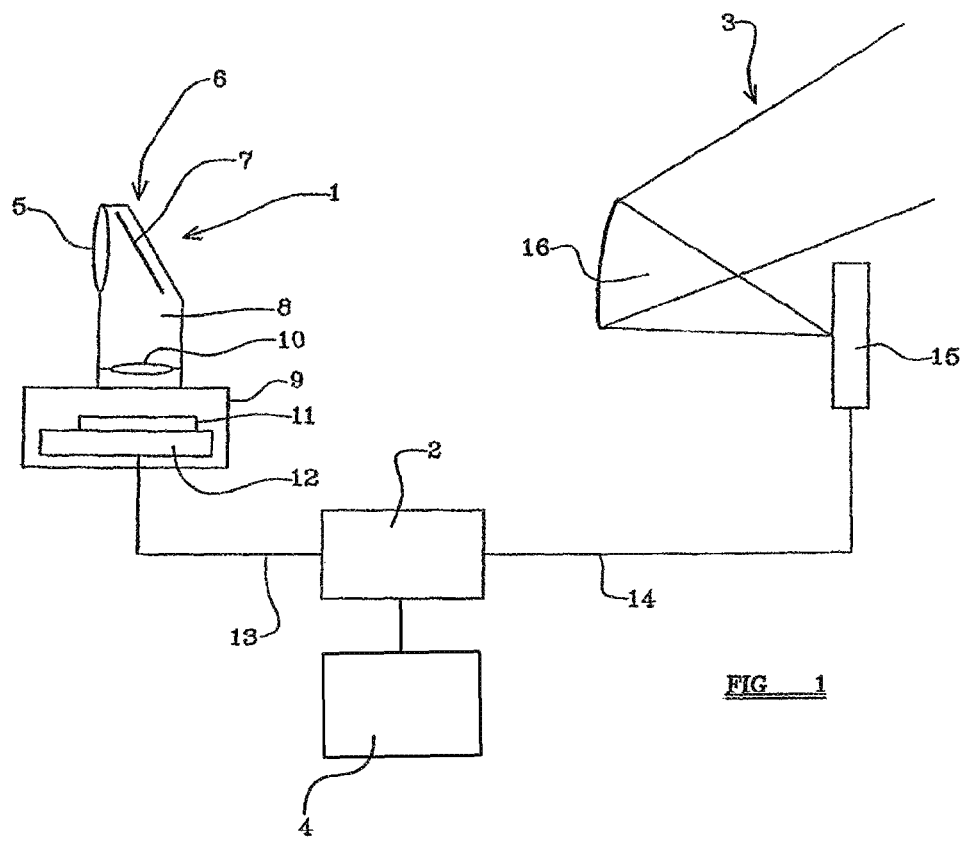
FIG. 1 is a block schematic view of one embodiment of the invention.

Referring initially to FIG. 1 of the accompanying drawings, a night vision system for a motor vehicle comprises a camera 1, a signal processing arrangement and a display unit 3.

The camera 1 is provided with a lens 5. The front face of the lens is dome-shaped, and the front face of the lens is provided with a hard coating of micro-sized diamond. The dome-shape of the lens tends to facilitate cleaning of the lens by wind as the vehicle on which the camera is mounted moves. Located behind the lens 5, in alignment with the optical axis of the lens, is a beam deflector 6 which is constituted by an inclined mirror 7. The beam deflector is provided in a hollow tubular neck 8, which contains a focusing lens 10 which may be adjusted by means of a focusing ring (not shown). The neck 8 is connected to a lower housing 9. The housing 9 contains an infra-red sensor element 11, which may be a charge-coupled sensor element, which is mounted on an electronic unit 12.

It is to be appreciated, therefore, that in use of the camera 1, the camera will be positioned so that the image viewed by the lens 5 is an image of the roadway in front of the vehicle. The image, after being deflected by the beam deflector 6, is focussed, by the focusing lens 10, on to the planar infra-red sensor element 11. The focus, and thus the field of view, of the camera may be adjusted by adjusting the focusing ring to provide an "optical zoom" effect in response to a central signal from the sensor unit 4.

The camera 1 provides a video output signal on an output lead 13. The output lead 13 is connected to a signal processor 2 forming part of the signal processing arrangement. The signal processor 2 is connected to receive an input control signal from a sensor unit 4. The sensor unit 4 may be simply a speed sensor adapted to sense the speed of the vehicle. The speed sensor may be connected to the speedometer of the vehicle, or may be connected to a wheel speed sensor forming part of an ABS system. Alternatively, the sensor unit 4 may be responsive to the position of the front or steering wheels of the vehicle, or an element associated with the steering wheels of the vehicle, such as a tie rod or the steering wheel shaft. Alternatively again, the sensor unit 4 may be a sensor which can sense the instantaneous position of the vehicle in a co-ordinate system, thus providing signals corresponding to the instantaneous speed and driving direction of the vehicle. Thus, for example, the sensor unit 4 may be a GPS (Global Positioning System) sensor. The GPS system utilises signals from a number of geo-stationary satellites which transmit accurate timing systems. A GPS sensor processes the signals that it receives from the satellites and can provide very accurate indications as to the position of the sensor. Thus it is envisaged that the sensor unit 4 may incorporate a GPS sensor to process signals received from the satellite system to determine the position of the vehicle, with the sensor unit 4 including a processor to determine successive positions of the vehicle and to determine the instantaneous speed and driving direction of the vehicle. It is thus to be appreciated that the sensor unit 4 may include one or more sensors of the types generally discussed above, and the sensor unit 4 will provide a control signal as an input to the signal processor 2, that input being indicative of the speed of the vehicle and/or the direction of driving of the vehicle.

The signal processor 2 has an output 14 which is connected to an image generator 15 forming part of the display unit 3. The image generator 15 may be a cathode-ray device, or any other conventional form of image generator. The image generator 15 is positioned appropriately with regard to a semi-silvered aspherical mirror 16 which forms part of a conventional head-up display unit. The mirror 16 may be mounted on, or may form part of the windshield of a vehicle and may be positioned so that the virtual image that is displayed on the minor 16, from the image generator 15, as viewed by the driver of the vehicle, is super-imposed on the ordinary view of the roadway in front of the vehicle enjoyed by the driver of the vehicle.

As will be described below, in embodiments of the invention, the signal processor 2 processes the signal received from the camera 1, so that the image displayed by the display unit 3 is appropriate, taking into account the speed and/or direction of driving of the vehicle.

Figure 2:
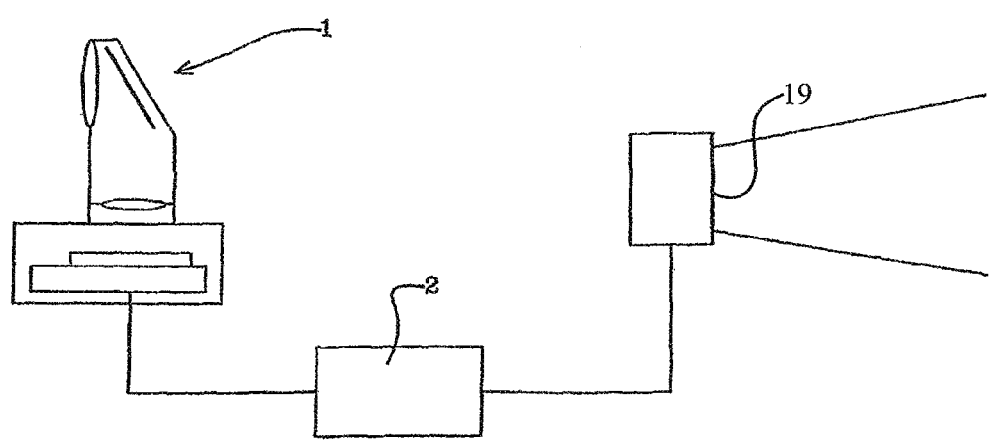
FIG. 2 is a corresponding block schematic view of a second embodiment of the invention.

FIG. 2 illustrates an alternative embodiment of the invention. The camera 1 and the signal processor 2 are as described above with regard to FIG. 1, and thus these parts of the system will not be re-described.

In the embodiment of FIG. 2, instead of a head-up display unit 3 as described in FIG. 1, a simple monitor or display unit 19 is provided, which displays the image obtained from the camera as processed by the signal processor 2. The monitor or display unit 19 will be positioned so as to be readily viewable by the driver of a vehicle.

Figure 3:
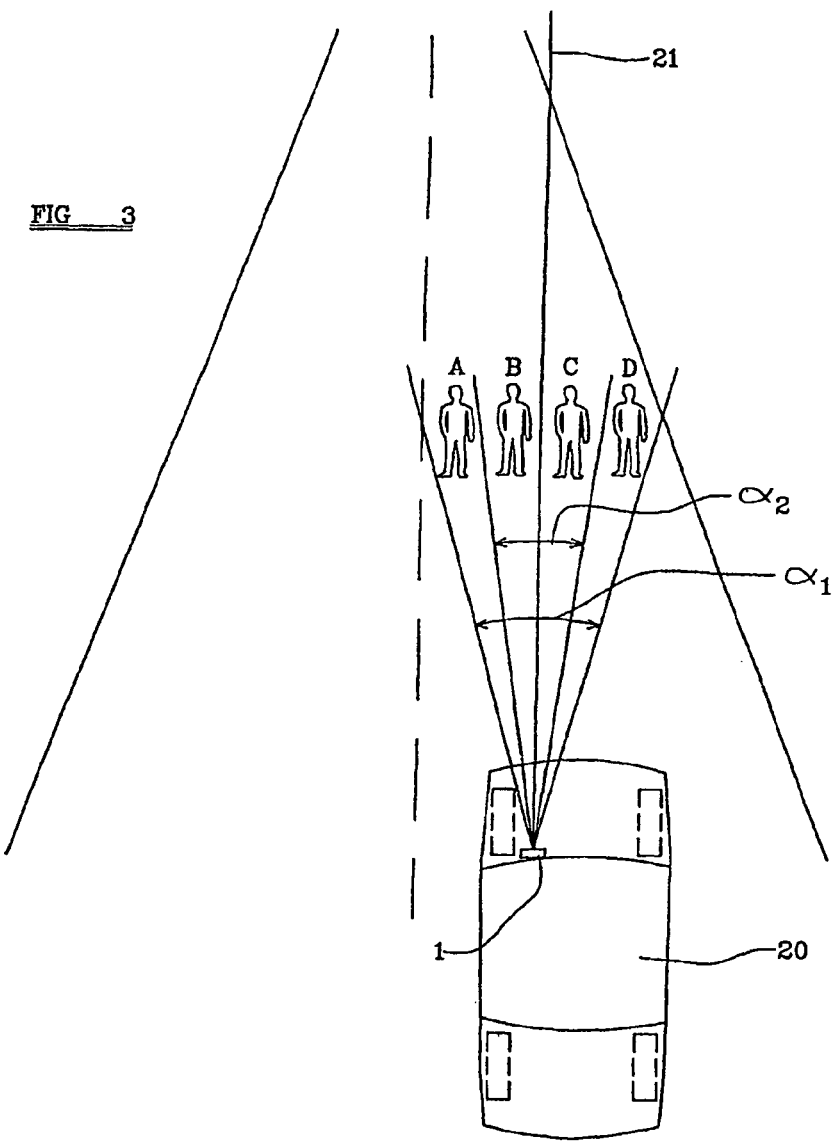
FIG. 3 is a diagrammatic plan view of a vehicle provided with a night vision arrangement in accordance with the invention.

Referring now to FIG. 3, a vehicle 20 is illustrated schematically from above, and the camera 1, as described above, is shown mounted in position on a vehicle 20. The camera is mounted in a fixed position, with the optical axis 21 of the lens 5 aligned with the longitudinal axis of the vehicle 20, so that the camera can capture an infra-red image of the road in front of the vehicle.

In the embodiment of FIG. 3, the sensor unit 4 provides a signal to the signal processor 2 which indicates the speed of the vehicle, and the signal processor 2 processes the signal representative of the image so that the horizontal width of the field of view of the image displayed is decreased as the speed of the vehicle increases.

When the vehicle is stationary, or travelling at a very slow speed, the signal processor 2 processes the signal from the camera 1 so that the display unit 3 displays a very wide image of the roadway in front of the vehicle. This image may have an angular field of view of a 1, as shown in FIG. 3.

Figure 4:
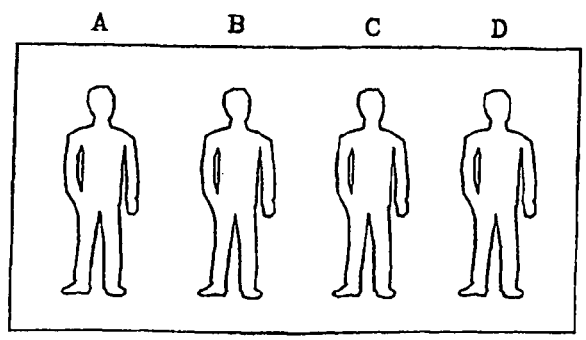
FIG. 4 is a diagrammatic view of a display provided on the vehicle of FIG. 3 in one condition.

For purposes of explanation, FIG. 3 illustrates schematically four pedestrians standing in a roadway in front of the vehicle, identified as pedestrians A, B, C and D. With the relatively wide angular field of view α 1 of the displayed image when the vehicle is stationary or travelling slowly, all four pedestrians are shown in the image presented to the driver of the vehicle by the image display unit 3, as shown in FIG. 4.

Figure 5:
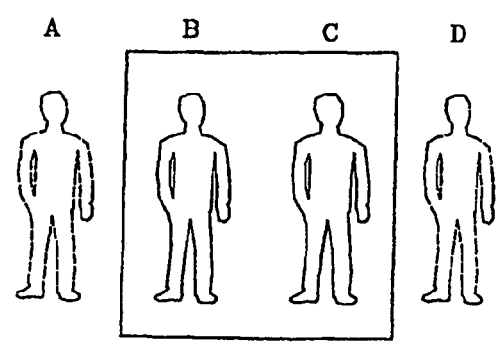
FIG. 5 is a view corresponding to FIG. 4 illustrating the display in another condition.

However, as the speed of the vehicle increases, the signal processor 2 reduces the angle of the field of view of the image that is presented on the display, whilst simultaneously magnifying the image so that the image still completely fills the display. Thus, as shown in FIG. 5, only the central pair of pedestrians B and C are illustrated when the vehicle is travelling swiftly, the pedestrians A and D no longer being present in the displayed image.

It is thus to be appreciated that when the vehicle is travelling slowly, for example in a built-up area, the image displayed will be wide enough to include any cycle tracks, walkways or the like, located at the side of the roadway that the vehicle is driving along, so that the driver of the vehicle may be alerted to potentially dangerous situations, such as pedestrians about to walk into the roadway. However, when the vehicle is travelling swiftly, a relatively narrow field of view is presented to the driver of the vehicle, showing the roadway in front of the vehicle.

In the embodiment described above, the signal processor 2 electronically processes the signal to select the field of view which is displayed on the display unit 3 or 19. It is to be appreciated, however, that in a modified embodiment of the invention the field of view displayed on the display unit 3 or 19 may be adjusted by altering the focus of the lens 5 using the focusing ring, to provide an "optical zoom" effect, so that the optics of the camera are adjusted to ensure that the appropriate image is displayed.

Figure 6:
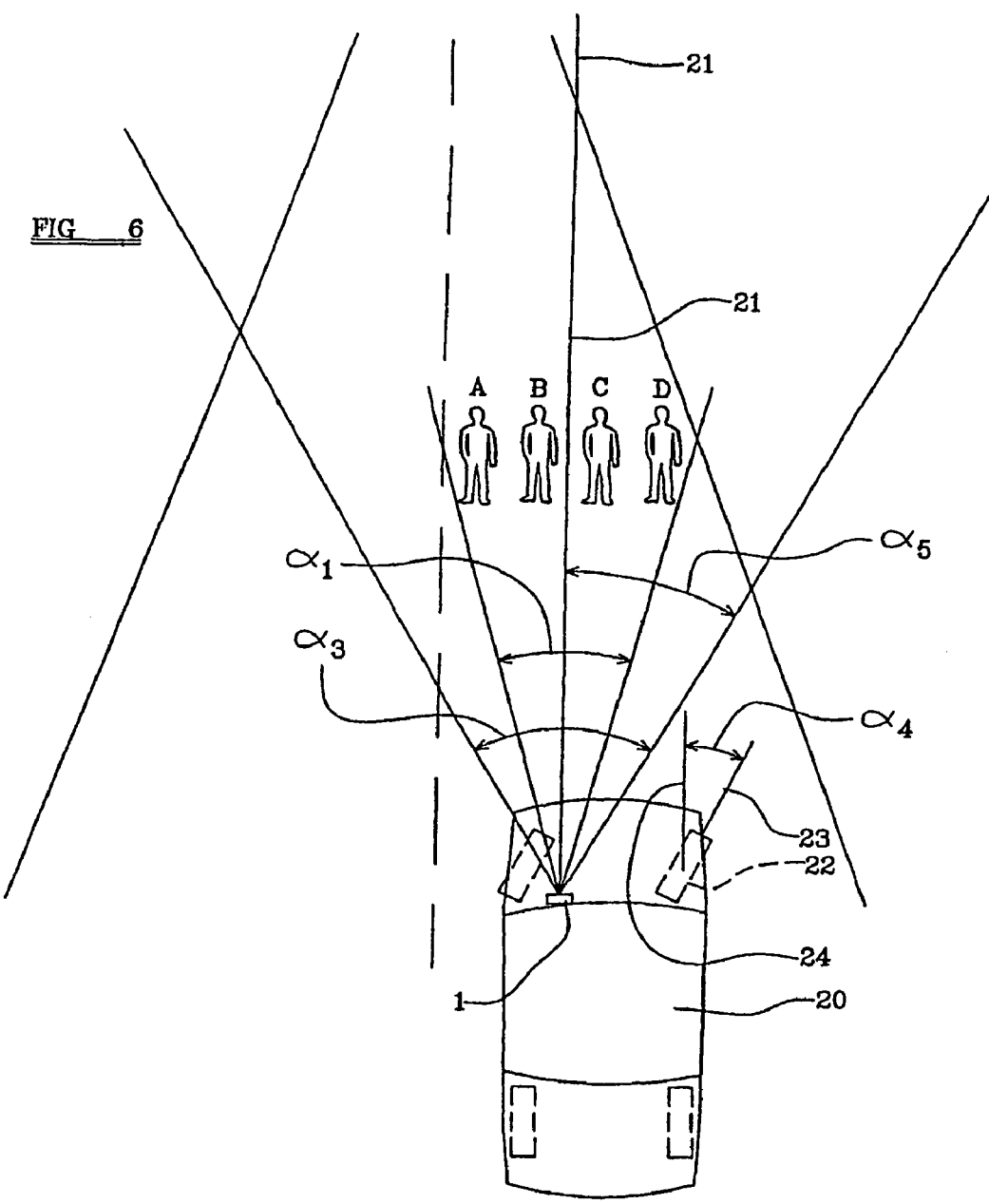
FIG. 6 is a diagrammatic view, corresponding to FIG. 3, of a vehicle provided with another system in accordance with the invention.

FIG. 6 illustrates a further embodiment of the invention. In this embodiment of the invention, a camera 1 of the type described above is mounted in a fixed position on a vehicle 20 with the optical axis 21 of the camera aligned with the longitudinal axis of the vehicle.

The camera is adapted to receive an optical image over a very wide angular field a 3. Ordinarily the image displayed by the display device will be selected so that the image corresponds to a field of view having an angular width a 1, with that image being centered on the optical axis 21 of the camera. Thus, where four notional pedestrians A, B, C and D are shown standing in front of the motor vehicle 20, all four pedestrians will be within the image displayed by the display unit, if the vehicle is travelling straight.

However, FIG. 6 illustrates the vehicle in a "cornering" situation. The steering wheels 22 provided at the front of the vehicle have been turned so that the rolling direction 23 of the wheel is offset by an angle α 4 relative to the initial rolling direction 24 of the wheels 22 when the steering wheels are aligned with the longitudinal axis of the vehicle for straight driving. The vehicle is thus cornering.

Figure 7:
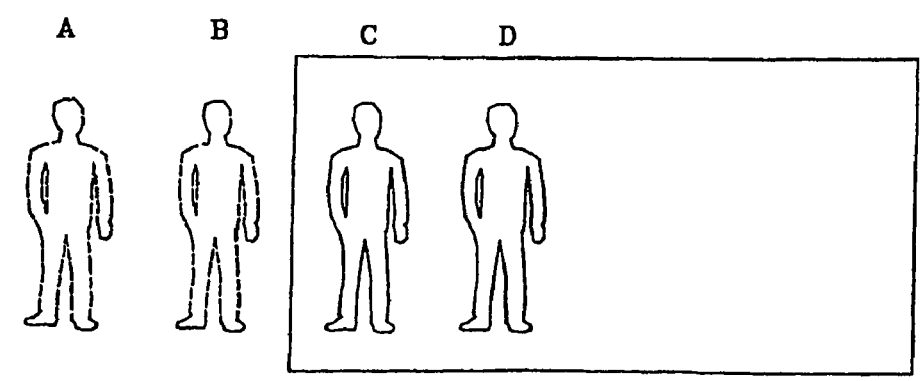
FIG. 7 is a view, corresponding to FIG. 4, showing the display of the embodiment of FIG. 6.

The sensor unit 4, in this embodiment, senses the angle α 4 and controls the signal processor 2 so that the image which is displayed by the display unit is offset from the optical axis 21, so as to display the environment into which the vehicle will move. Thus, the angle of field of view now displayed is shown as angle α 5. FIG. 7 illustrates the display, showing that the display only shows the two pedestrians C, D, provided at the end of the row of pedestrians, with the other two pedestrians A, B, not being displayed.

It is thus to be appreciated that, in the embodiment shown in FIG. 6, the field of view that is displayed is determined in accordance with the angular position of the rolling direction of the front steering wheels 22 of the vehicle.

In a similar way, the field of view that is displayed may be determined from the driving direction of the vehicle, for example as determined from a GPS sensor.

It is to be appreciated that various modifications may be effected to the arrangement described above. In one embodiment of the invention, the signal processor 2 operates so that when the vehicle corners at low speed, the width of the field of view presented on the display increases while the field of view remains aligned with the optical axis 21, whereas when cornering at a higher speed, the overall angular width of the field of view is maintained, but the field of width is offset from the optical axis 21. The angle of offset from the optical axis 21 is preferably equal to the angle α 4.

In the present Specification "comprise" means "includes or consists of" and "comprising" means "including or consisting of".

What is claimed in the patent application:

1. A night vision arrangement for a motor vehicle, the night vision arrangement comprising an infra-red-sensitive camera fixed to the motor vehicle to capture an image of a roadway in front of the vehicle, the camera generating a video signal representing the captured image, the arrangement further comprising a display unit adapted to display at least part of the captured image, the arrangement further comprising a unit processor adapted to process the video signal, and a sensor unit adapted to sense one or more parameters of a movement of the vehicle, and to provide a control signal, the arrangement being such that, in use, the signal processor electronically processes the video signal so that a field of view of an image displayed by the display unit is selected in accordance with said control signal, wherein the arrangement is configured such that when the vehicle corners at a first speed, a horizontal width of the field of view of the image displayed is increased and remains aligned with an optical axis of the camera, and when the vehicle corners at a second speed, the horizontal width of the field of view of the image displayed is maintained and is offset from the optical axis of the camera, the first speed being lower than the second speed.

2. An arrangement according to claim 1 wherein the display unit is a monitor which displays the displayed image directly to a vehicle driver.

3. An arrangement according to claim 1 wherein the display unit is a head-up display unit.

4. A night vision arrangement for a motor vehicle, the night vision arrangement comprising an infra-red-sensitive camera fixed to the motor vehicle to capture an image of a roadway in front of the vehicle, the camera generating a video signal representing the captured image, the arrangement further comprising a display unit adapted to display at least part of the captured image, the arrangement further comprising a signal processor adapted to process the video signal, and a sensor unit adapted to sense one or more parameters of a movement of the vehicle, and to provide a control signal, the arrangement being such that, in use, the signal processor electronically processes the video signal so that a field of view of an image displayed by the display unit is selected in accordance with said control signal, wherein the arrangement is configured such that when the vehicle corners at a first speed, a horizontal width of the field of view of the image displayed is altered and remains aligned with an optical axis of the camera, and when the vehicle corners at a second speed, the horizontal width of the field of view of the image displayed is maintained and is offset from the optical axis of the camera, the first speed being lower than the second speed.

5. An arrangement according to claim 4 wherein the display unit is a monitor which displays the displayed image directly to a vehicle driver.

6. An arrangement according to claim 4 wherein the display unit is a head-up display unit.

7. A night vision arrangement for a motor vehicle, the night vision arrangement comprising an infra-red-sensitive camera fixed to the motor vehicle to capture an image of a roadway in front of the vehicle, the camera generating a video signal representing the image, the arrangement further comprising a display unit adapted to display at least part of the captured image, the arrangement further comprising a signal processor adapted to process the video signal, and a sensor unit adapted to sense one or more parameters of a movement of the vehicle, and to provide a control signal, the arrangement being such that, in use, the signal processor electronically processes the video signal so that a field of view of an image displayed by the display unit is selected in accordance with said control signal, wherein the arrangement is configured such when the vehicle corners, each of an optical axis and a horizontal width of the field of view of the image displayed are altered or maintained depending on a speed at which the vehicle corners.

8. An arrangement according to claim 7 wherein the display unit is a monitor which displays the displayed image directly to a vehicle driver.

9. An arrangement according to claim 7 wherein the display unit is a head-up display unit.

* * * * *